STAVE JOINTER

C. B. HUTCHINSON
INVENTOR
AUBURN, N.Y.

75021

PATENTED MAR 3 1868

Witnesses.
E. L. Hutchinson
S. C. Hull

Charles B. Hutchinson

United States Patent Office.

CHARLES B. HUTCHINSON, OF AUBURN, NEW YORK.

*Letters Patent No. 75,021, dated March 3, 1868.*

IMPROVEMENT IN MACHINES FOR JOINTING STAVES.

The Schedule referred to in these Letters Patent and making part of the same.

TO ALL WHOM IT MAY CONCERN:

Be it known that I, CHARLES B. HUTCHINSON, of Auburn, in the county of Cayuga, and State of New York, have invented certain new and useful Improvements in Stave-Jointers; and I do hereby declare that the following is a full, clear, and exact description thereof, and of the mode of operating therewith, reference being had to the accompanying drawings, making a part of this specification, wherein—

Figure 1:
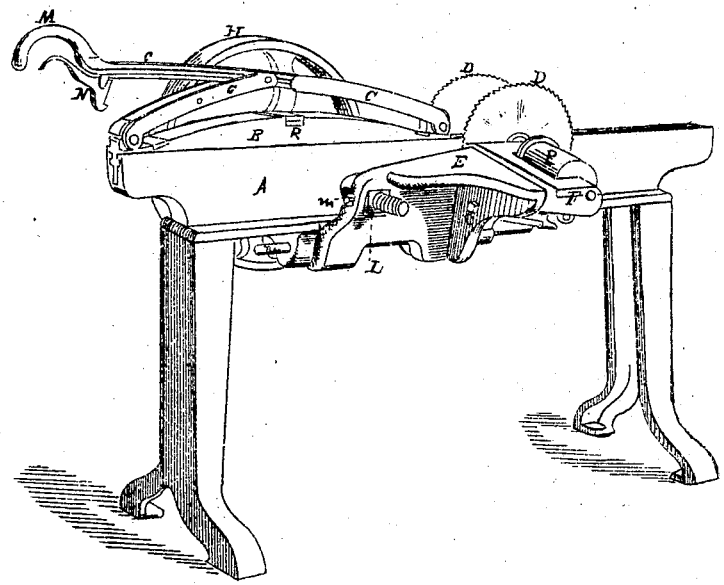

Figure 1 is a perspective view of the machine.

Figure 2:
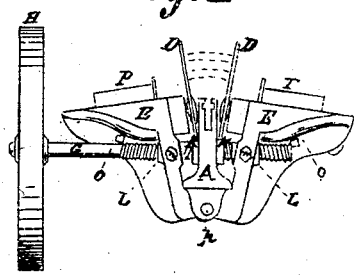
Figure 3:

Figure 2, an end view of the working parts, omitting the carriage or bed on which the stave rests, and also the supports of the frame; and Figure 3, a side view of the said carriage or bed detached, with a stave clamped upon it.

The improvements which I have made have relation especially to that class of jointers in which the stave, while bent to the shape which it is to have in the cask, is jointed by saws or other cutters acting in a plane passing longitudinally through the centre line or axis of the cask.

In the accompanying figures, A represents the frame of the machine, B a carriage, to receive the stave, and C c the clamps by which it is bent to the required shape, held in place, and driven between the inclined staves D D to be jointed. The lower part of the carriage B forms a T-shaped tongue, which is fitted to a corresponding groove in the top rail of the frame A. Its upper surface is so shaped that when the stave is clamped upon it, it has the same bilge or lengthwise curvature which it is to have in the cask, except as that shape is modified in the manner and for the purpose presently to be stated. The saws D D are so set, primarily, as to point towards the centre of the circle of which the dressed stave, in its cross-section, is an arc. In the line of this centre, passing through and supported by lugs projecting from the under side of the frame A, is a long bolt or pin, $p$, on which the side-pieces E E are pivoted. These side-pieces carry the bearings F F, on which run the saw-arbors, with their pulleys P P, and they are opened to and kept fixed at any required distance by turning the hand-wheel H on the right and left screw G. By this means the saws are instantaneously set to any required width of stave, still pointing to the same centre. The screw G passes through a vertical slot in the frame A, in which it rises or falls, as required, by the movement of the side-pieces towards or away from each other. It reacts on the frame A through the collars K K, which also serve as guides to keep it horizontal, and insure an equal and simultaneous movement of the saws. The nuts L L, through which it acts on the side-pieces E E, are suspended in slots upon opposite horizontal pins or centres, $m\ m$, (of which one only of each pair is seen in the drawings,) forming an axis on which they can turn, so as to keep in line with the screw G, whatever the angle it may make with the side-pieces.

By the arrangement thus far described, the bevel given to the stave would be in the line of the radius of the circle formed by the periphery of the cask, and of which the convex surface of the stave is a portion. Although this bevel makes a joint which is theoretically perfect, it is found to be practically better that the staves, when set up, should first come to a bearing along their inner edges, leaving the joint on the outer edge a little open, so that the hoops when driven may act with more advantage in compressing the wood (which advantage will be in proportion to the diminution of the surfaces in contact and subject to compression thus insuring a tight joint on the inside, where only it is needed. To effect this, the flanges of the bearings F and the side-pieces E, which are dressed square with the plane of the saws, are put together by two bolts, one of which (not seen in the drawings) forms a centre, while the other passes through a curved slot, O, allowing to the bearings F a small range of movement about the centre-pin, when the nut upon the other is loosened. The saws may thus be adjusted so as to converge towards a point below the true centre $p$, and give any desired diminution of the bevel, which should vary with the thickness of the stave and the compressibility of the wood. But by thus lowering the centre, towards which the saws converge, the width given to the ends of the stave, corresponding to any given width in the middle, would be increased, and the barrel formed of such staves would consequently have less bilge, that is, less difference between the head and bung diameters. This will readily be seen by reference to fig. 2, where the upper dotted lines represent a section of the jointed stave at the middle, the lower a section at its ends. Supposing the saws set so as to converge towards a point lower than $p$, while still giving the same width at the middle of the stave, it is obvious they would give a greater width at the ends. To remedy this, and restore the proper ratio between middle and ends, the bilge given to the bed of the carriage B, instead of being exactly that required for the cask, must be made somewhat greater. For this purpose, the bridge-piece R is let into the central or highest portion of the carriage-bed B, where it rests upon two blocking-pieces, and is kept in place by a single set-screw passing between them. It may be adjusted to any required height by using thicker or thinner blocks, thus varying at pleasure the exaggeration of the bilge, in accordance with the variations that may be required in the bevel. In a similar manner an adjustment may be obtained at the ends of the bed B, if required.

The clamps, by which the stave is brought to and kept in its place upon the carriage-bed B, are composed of the two levers C and c, which are hinged upon the carriage at either end. On the end of the longer lever, C, is the handle M, by which it is operated. The shorter, c, is a split lever, formed of parallel bars, which, passing on each side of the longer arm, take hold of it by means of short studs working in grooves cut in its sides. Both levers are thus operated by the one handle, and, when near the point of action, with an equal movement and leverage. When the stave to be jointed, which is supposed to have been partially bent before seasoning, is placed on its bed on the carriage B, its ends meet the levers C c, very near to their fulcra, and the power, applied at the handle M, acts with a leverage due to the length of C compared with that short distance. The power thus gained is increased threefold or more by the leverage of the stave itself, being applied at its ends, whereas the bending, and of course the resistance, occurs in and is distributed through that third of its length which is nearest to its centre. By this compound leverage, power enough is gained to bend the thickest stave. When the clamps have brought the stave to its place, it is kept there by the pawl N dropping by gravity under a catch at the heel of the carriage, which is disengaged to remove the stave when jointed by lifting its trigger-end under the handle M.

In the arrangement thus described, I claim, as an improvement on those forms of stave-jointers heretofore in use in which the stave is jointed while bent to the shape, or nearly the shape, which it is to have in the cask—

1. The combination of the right and left-hand screw G, pivoted nuts L L, and pivoted side-pieces E E, carrying saw-arbors and saws, all constructed and arranged to operate to adjust the saws to different width of staves, substantially as described, and for the purposes set forth.

2. The combination of clamping-levers C c with the carriage B, when constructed and operating substantially as described.

CHARLES B. HUTCHINSON.

Witnesses:
E. C. HALL,
E. L. HUTCHINSON.